Jan. 15, 1935.  W. I. McLAUGHLIN ET AL  1,987,696
CORE ORIENTING AND WELL SURVEYING DEVICE
Filed May 10, 1930  3 Sheets-Sheet 1

Inventors
William I. McLaughlin
Henry N. Herrick
Rupert G. Wedemeyer
By Lyon & Lyon
Attorneys

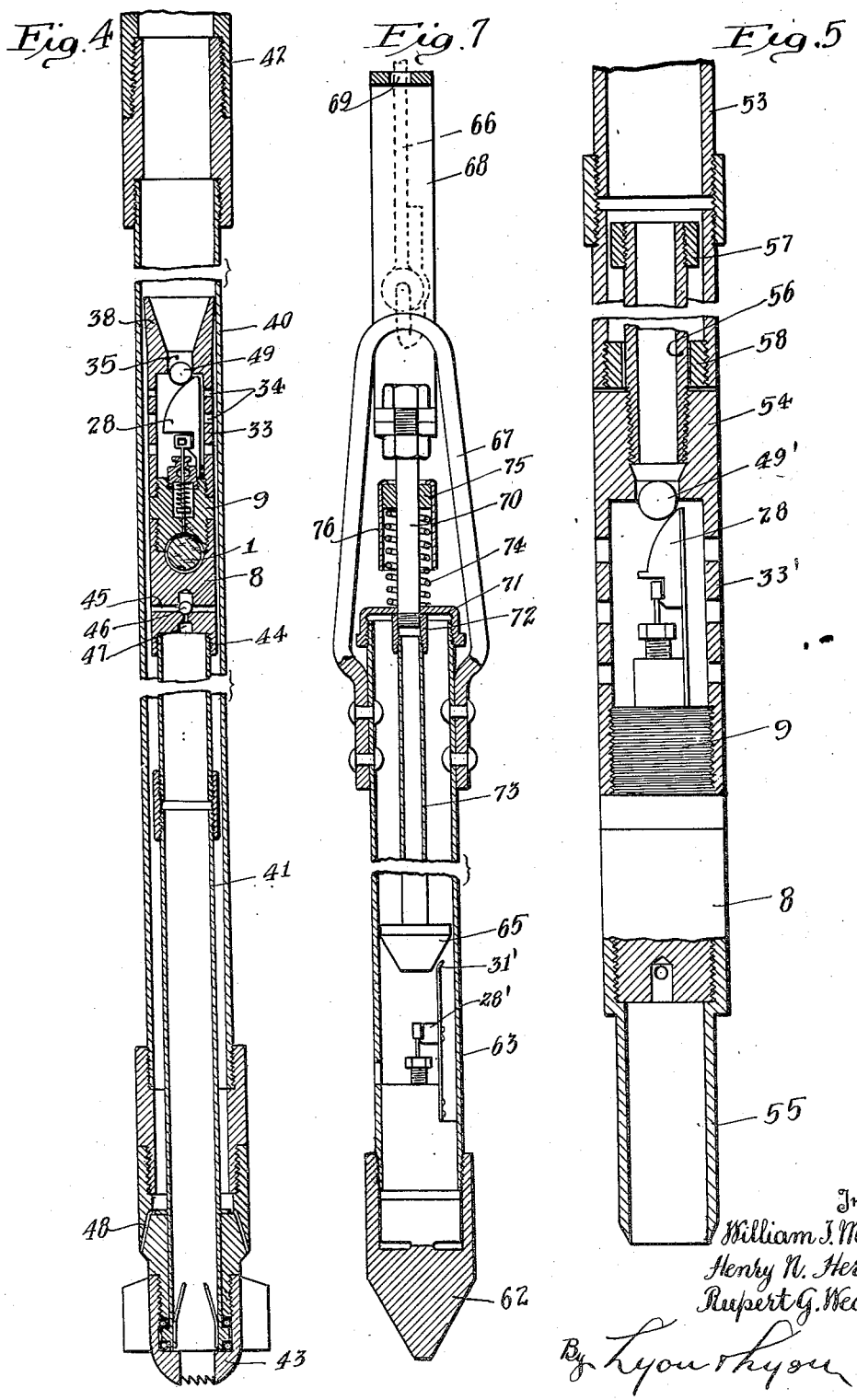

Jan. 15, 1935.  W. I. McLAUGHLIN ET AL  1,987,696
CORE ORIENTING AND WELL SURVEYING DEVICE
Filed May 10, 1930  3 Sheets-Sheet 3
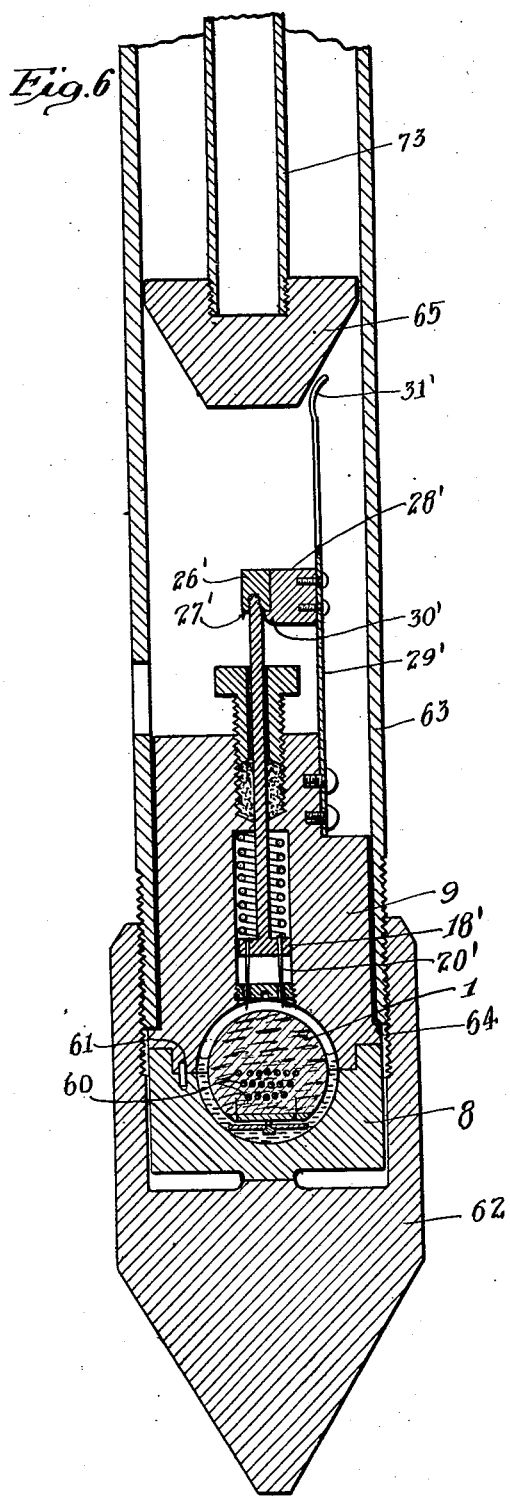
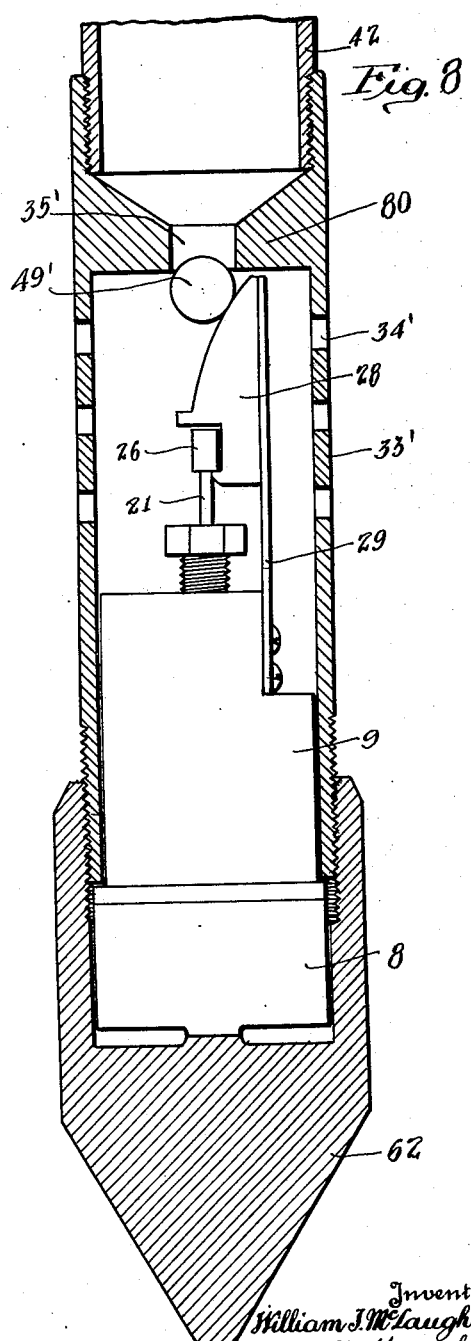
Inventors
William I. McLaughlin
Henry N. Herrick
Rupert G. Wedemeyer
By Lyon & Lyon
Attorneys Patented Jan. 15, 1935

1,987,696

UNITED STATES PATENT OFFICE 1,987,696

CORE ORIENTING AND WELL SURVEYING DEVICE

William I. McLaughlin and Henry N. Herrick, Berkeley, and Rupert G. Wedemeyer, Palo Alto, Calif., assignors to Standard Oil Company of California, San Francisco, Calif., a corporation of Delaware Application May 10, 1930, Serial No. 451,320

13 Claims. (Cl. 33—205)

This invention relates to a device for surveying wells to determine the degree of angular deviation from the vertical and the direction of such deviation with respect to the points of the compass. The device is also useful for orienting cores or samples taken from the earth formation at the bottom of the well. When employed as a core orienting device the invention may be used with rotary core drills or "percussion" type core drills such as are sometimes used in rotary drilling, or "standard" cable tool drilling.

More particularly, the invention relates to a device of the type described which utilizes a magnetic element supported by a freely floating sphere in a substantially non-viscous liquid, thus forming a floating magnetic compass, together with means for transfixing the sphere in any given position.

Many attempts have been made heretofore to provide suitable means for transfixing a floating compass in a well surveying instrument, but so far as is known, none of the prior devices have been entirely successful. The principal difficulty with this type of device is that the compass float tends to stick to the side walls of the float chamber. The force which causes the float to adhere to the side walls of the chamber is much greater than the magnetic force which tends to swing the magnetic needle or element into the magnetic meridian. The result is that such devices are very unreliable in recording the direction of the magnetic meridian; though they may be reliable enough in recording the angle of deviation from the vertical.

It is the purpose of the present invention to provide a compass float of such construction that it will not stick to the side walls of the float chamber.

Another object of the invention is to disclose and provide a simple and effective means of transfixing or locking the compass float when it is desired to take a reading.

Another object is to disclose and provide means whereby the degree of angular deviation from the vertical and the direction of such deviation with respect to the points of the compass may be readily and accurately determined, and the device locked or transfixed in a well hole by the operation of means at the top of the well hole.

A still further object is to disclose and provide a device for surveying wells and orienting cores or samples taken from formations at the bottom of the well, which is extremely simple, accurate and efficient in operation.

The nature of the invention may be best understood from a description of a preferred embodiment thereof, together with several modifications adapted for specific uses to which the device may be put.

In the subsequent description, reference will be had to the appended drawings, in which:

Fig. 4 is a longitudinal section through the device shown in Fig. 1, said device being positioned and shown in combination with a complete rotary core barrel.

Fig. 5 is a longitudinal section through a percussion type core barrel equipped with a surveying device of the character shown in Fig. 1.

Fig. 6 illustrates a form of surveying instrument adapted to be used on cable or wire lines.

Fig. 7 is a side elevation, partly in longitudinal section, of a surveying device adapted to be used on a wire line for surveying the well, this figure illustrating the arrangement of elements which permits the surveying device to be actuated when it is suspended from a wire or cable.

Fig. 8 is a longitudinal section of the surveying head adapted to be connected to a string of drill pipe for surveying purposes only, such surveying head including a device of the character shown in Fig. 1.

As stated hereinabove, compass floats and assemblies such as have been used heretofore are not successful, primarily because the compass float tends to stick to the side wall of the float chamber. It has been found, however, that if the compass float is so designed that the only possible points of contact between the float and the side walls of the float chamber are below the surface of the liquid, then the attraction between the float and the wall is greatly diminished.

It has also been found that if the float is provided with a loosely fitting circumferential bumper below the surface of the liquid in which the compass floats, the friction between the float and the walls is substantially eliminated, thereby permitting the compass float to assume the desired position rapidly and accurately.

In addition, it has been found that if the bumper is placed below the float and attached thereto by a substantially single point of contact, such as a loosely fitting pin, any friction between the bumper and the float can be substantially eliminated.

Figure 1:
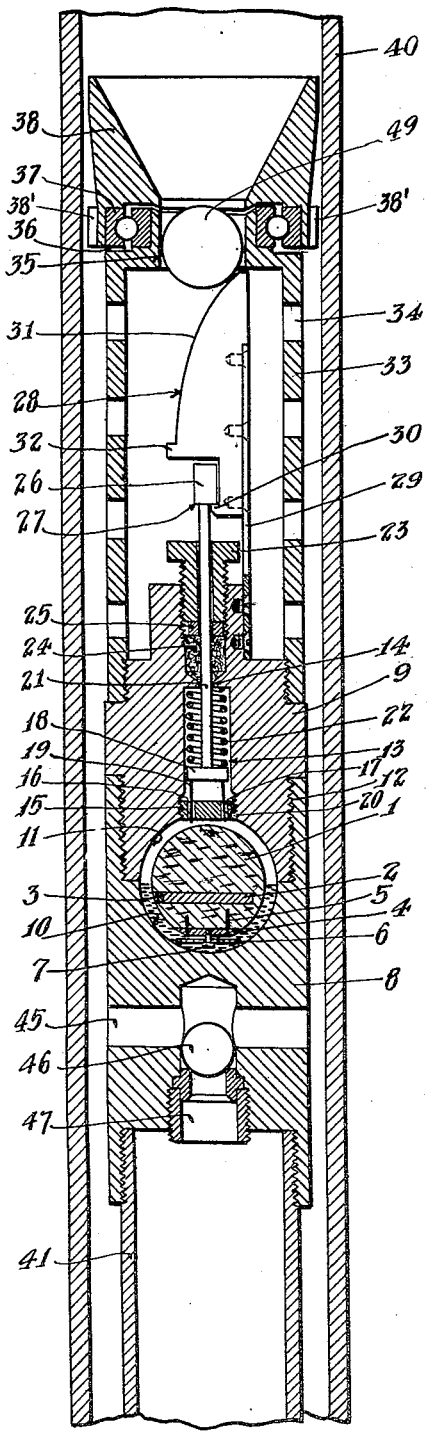
Fig. 1 is a longitudinal section of a preferred form of surveying device in combination with a rotary core barrel of well known type.

As shown in the drawings, and particularly in Fig. 1, the device comprises a spherical float 1 composed of cork or other suitable light material. A recess may be formed in the float and a magnetic needle or bar 2 inserted therein. The end of the recess may be plugged with a suitable sealing material, such as sealing wax or paraffine 3. The magnetic needle may be placed either above or below the horizontal axis of the float 1, but it is preferred to place it below the center in order to stabilize the float by establishing its center of gravity below its center of buoyancy. Additional stabilization may be effected by attaching a weight 4 to the bottom of the float. The weight 4, shown in Fig. 1, is a circular plate of lead or Babbitt metal secured to the float by means of pins 5.

In order to prevent the float 1 from sticking in contact with the side walls of the container in which it is suspended, a circular bumper disc 6 may be loosely secured to the bottom of the float by a pin or screw 7, which fits loosely in a hole through the center of the disc 6. The disc 6 is sufficiently large in diameter so that it extends beyond the periphery of the spherical float 1. The float is preferably marked with a "North" and "South" axis, corresponding to the direction of the magnetic poles of the magnet 2. The assembly just described, when placed in a suitable container containing non-viscous liquid, and allowed to float freely therein, without contact with the wall of the container, will assume a position with the axis of its magnetic element or elements parallel to the earth's magnetic field. This assembly or its equivalent may be designated as a "compass float", a "floating compass", or more simple a "magnetic compass." Preferably, the float is coated with a substance which is not wetted by the liquid in the chamber in which the float is suspended.

The float 1 may be contained in a cylindrical housing composed of a lower part 8 and an upper part 9, each part being provided with hemispherical recesses 10 and 11 respectively, which are adapted to meet to form a spherical float chamber which is slightly larger in diameter than the float 1.

The upper and lower halves 9 and 8, respectively, of the float housing may be held together by a threaded connection 12, or by any other suitable means. The upper half 9 of the float housing may be provided with a vertical axial bore 13 having a reduced diameter 14 near its mid section. The lower end of the bore 13 may be internally threaded so as to receive a plug 15 provided with a plurality of vertical perforations, such as the apertures 16 and 17.

A plunger 18 may be mounted in the lower portion of the bore 13, the lower face of the plunger 18 being provided with a plurality of pins 19 and 20 adapted to slidably pass through the perforations 16 and 17 formed in the plug 15. The plunger 18 is connected to the lower end of a push rod 21 which extends out of the bore 13 and above the top of the upper portion of the housing 9. A spring 22 is placed within the bore 13 between the plunger 18 and the reduced portion 14 of the bore 13. The upper portion of the bore 13 may be internally threaded so as to receive a gland 23 provided with a central aperture through which the push rod 21 may slidably pass. The portion of the bore 13 between the constriction 14 and the gland 23 may contain a suitable packing material 24 and a loosely fitting ring or washer 25.

The upper end of the push rod 21 may terminate above the gland 23 in an enlarged head 26 having a shoulder 27. A latch 28 may be supported by a spring 29 secured to the upper portion of the housing 9, the latch being provided with a shoulder 30 adapted to engage the shoulder 27 of the push rod head 26. The upper portion of the latch 28 may be provided with a convexly curved, substantially vertical face 31 extending above the shoulder 30, the lower end of said convexly curved face 31 terminating in a horizontal projection or shoulder 32.

Screwed to the upper end of the upper housing portion 9 is a cylindrical sleeve 33 containing a series of perforations 34. The upper end of the sleeve 33 may be reduced in diameter so as to form a restricted inner passage 35 and an outer annular shoulder 36 adapted to receive and support a ball race or ball bearing cage 37. A funnel 38 is supported by the ball race 37, the lower and smaller opening in the funnel being in alinement with the upper end of the passage 35 and of substantially equal diameter thereto. The outer and greatest diameter of the funnel 38 is slightly smaller than the interior diameter of the barrel 40 which surrounds the sleeve 33, as explained hereinafter. The lower and outer portions of the funnel 38 may be provided with vertical guides 41 which serve to center the funnel 38 in the barrel 40.

The device described hereinabove may be employed and is particularly adapted for use with a rotary core barrel as shown in Fig. 4. The outer core barrel is indicated at 40 and the inner barrel is indicated at 41. The construction of the rotary core barrels is well known in the art, and will not be described herein, other than to state that the outer barrel is connected at its upper end with the drill tubing 42 and is connected at its lower end to a drill bit 43. The inner core barrel is rigidly attached at its upper end to the float housing 8, as by the threaded connection indicated at 44, and such lower float housing portion 8 may be provided with an outlet 45, a ball check valve 46 and a port 47 leading to the interior of the inner barrel 41.

All of the parts indicated in Fig. 1, except the compass needle, are preferably made of a non-magnetic material so as not to interfere with the operation and accuracy of the compass needle. Those parts which must be strong, such as the outer core barrel 40 are preferably made of bronze.

The device shown in Figs. 1 and 4 may be operated as follows: When it is desired to take a core from a well and ascertain its inclination and angular position, the core barrel is disassembled and the lower section 8 of the float housing is filled with a substantially non-viscous liquid. If the operating temperatures are not to exceed 212° F., water may be used, or a light machine oil may be employed under ordinary conditions. The float 1 is then placed in the liquid. The plunger 18 is retracted, compressing the spring 22, and is then latched in retracted position by the latch 28, and particularly the shoulder 30 thereof. The upper housing 9 is then screwed into the lower housing 8 and the sleeve 33 screwed to the housing 9. The unit, including the float chamber and inner core barrel 41 is then inserted in the outer core barrel 40, which is then screwed to the drill tubing 42. The tubing and core barrel are then lowered to the bottom of the well and the core is cut out in the usual manner by rotating the drill tubing 42 while circulating drilling mud down through the drill tubing.

The mud fluid passes through the drill tubing 42, funnel 38, aperture 35 into the sleeve 33, and passes out through the apertures 34 in said sleeve onto the space between the inner and outer tubing 41 and 42, from which space the mud fluid may be discharged out into the well near the face of the bit 43, through suitable apertures such as the apertures 48.

On the completion of the cutting of the core, the rotation of the tubing 42 is stopped, but the pump continues to circulate the drilling fluid as described hereinabove. A metal ball 49 of slightly smaller diameter than the passage 35 in the funnel 38 is then dropped into the upper end of the drill tubing 42. The ball 49 will fall through the tubing 42 into the outer barrel 40 and into the funnel 38 which directs it into the restricted passage 35. The ball being immersed in the dense drilling mud does not fall with sufficient velocity to strike with a force sufficient to trip the latch 28 and tends to stop in the restricted passage 35 in the position shown in Fig. 4. The pressure of the mud fluid being supplied to said passage 35 forces the ball 49 through the passage 35, however, thus tripping the latch 28. The shoulder 32 of the latch 28 prevents the ball 49 from dropping below the head 26 of the push rod 21. When the latch 28 is tripped, the compressed spring 22 drives the plunger 18 downwardly against the plug 15. Simultaneously, the pointed pins 19 and 20 are driven through the apertures in the plug 15 into the float 1, transfixing it in position. The core barrel is then withdrawn from the well and disassembled.

The position of the float with respect to the inner core barrel 41 and its contained core will enable the observer to determine the orientation of the core with respect to the direction of the earth's magnetic lines of force. A mark is drawn across the top of the core, the mark corresponding in direction to the north and south axis of the float. The observer then measures the angular position of the east-west and the north-south axes of the float with respect to the horizontal and vertical axes of the housings 8 and 9, which correspond to the similar axis of the core. Thus any deviation of the core from the vertical can be measured and recorded. Likewise, the direction of the dip and strike of the strata exhibited by the core can be measured and recorded. The orientation of cores by such methods is well known in the art.

One of the important advantages obtained by the arrangement of elements embraced by this invention is the provision of a floating compass which can not contact with the side walls of the float chamber. While the float shown in Fig. 1 is the preferred design, the desired result (of preventing contact between the float and side walls of the chamber) can be accomplished by means other than the freely rotatable bumper disc 6 on the bottom of the float. For example, in the modification shown in Fig. 2, the float 1 is provided with an annular circumferential groove 50 and is provided with an annular bumper ring 51 fitting loosely in the groove or slot 50 and below the surface of the liquid within the container or housing. The bumper ring 51 may be made of celluloid, wood or composition and suitably coated with a covering material which is not wetted by the liquid within the float housing.

Figure 3:
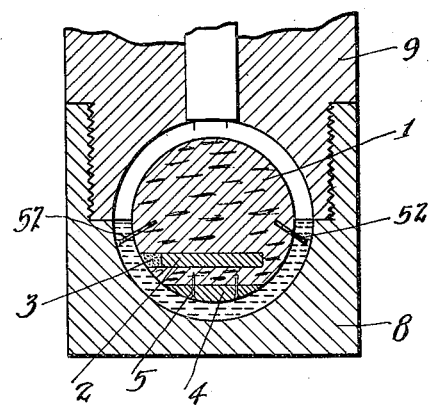
Fig. 3 illustrates another modified form of compass float adapted to be employed in devices coming within the scope of this invention.

Fig. 3 illustrates still another modification of a float. In this modification, the float 1 is provided with a plurality of pins 52, such pins 52 being circumferentially spaced around the float 1 and below the surface of the liquid in which the float 1 is suspended. These pins 52 act as bumpers.

In all forms of the invention it is essential that the bumper, of whatever form, be below the surface of the liquid in which the float is suspended. If the point of contact of the bumper and wall of the chamber is above the surface of the liquid, drops of liquids may form a tenuous adhering film between the bumper and the side wall of the chamber. The strength of the bond of a single drop of liquid between such a float or bumper and the wall of the chamber may be, and usually is, much greater than the magnetic force which tends to turn the floating compass into parallel relation with magnetic lines of force. The surface tension of the liquid is, of course, an important factor in determining the strength of the bond, and for this reason a substantially non-viscous liquid is preferably employed.

When water is employed as the liquid in the chamber, the float is preferably coated with paraffine, wax or other substances not wetted by water. If the float were not coated with a substance which is not wetted by the liquid in the chamber, the float might carry adhering drops of liquid large enough to fill the space between the float and the side wall of the chamber. The drops of liquid might cause the float to adhere to the side wall.

The coating also prevents the float from absorbing liquid. When a light machine oil is used, the float and bumpers may be coated with shellac or varnish.

Fig. 5 shows a compass float and transfixing mechanism of the type shown in Fig. 1, adapted for use with what is known as a punch or percussion type of core barrel. Such a punch core barrel is shown in Patent No. 1,636,084 issued to Walter N. Thompson. Punch core barrels are used with rotary drill pipe, such as the drill pipe 53, but instead of rotating the pipe 53 to cut the core, as was the case in the core barrel illustrated in Fig. 4, the drill pipe 53 is reciprocated, causing a hammering on the head 54 formed on the upper end of the perforated sleeve 33'. The force of the blow is transmitted through the sleeve 33' and the housings 9 and 8 to the punch member 55, which is screwed onto the bottom of the housing portion 8. After the core has been cut, the float is transfixed in position by dropping a ball, such as the ball 49' down the tubing in the same manner as previously described.

As shown in Fig. 5, the head 54 is provided with a piece of tubing 56 threadedly connected thereto, said tubing being provided at its end with a collar 57 which is adapted to engage with a ring 58 threadedly connected to the interior of the drill pipe 53, thus permitting the drill pipe 53 to move with respect to the core barrel within limits established by the head 54 and the collar 57.

If the float device is used merely as a well surveying instrument (to measure any deviation of the well from the vertical) it is not necessary that the device be attached to a core barrel as described in Figs. 4 and 5. Figs. 6, 7 and 8 relate to the use of the device in surveying wells.

Figure 2:
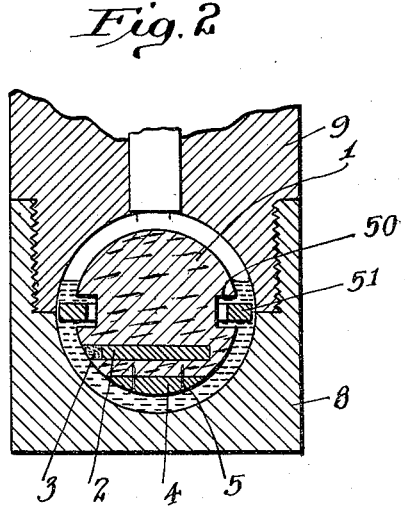
Fig. 2 is a modified form of compass float adapted to be employed in the device shown in Fig. 1.

As shown in Fig. 6, the well surveying instrument may be essentially similar to that shown in Fig. 1. The float 1 (of the device shown in Fig. 6) may contain a plurality of magnetic needles 60, instead of a single magnetized bar such as is shown in Figs. 1, 2 and 3. The use of either type of magnet is optional. Furthermore, as shown in Fig. 6, the upper and lower float housings 8 and 9 may be pinned together, as by means of pins 61, the lower housing portion 8 resting in a cylindrical head member 62 which is screwed to the lower end of a sleeve 63.

The main portion of the upper housing member 9 may be of slightly smaller diameter through the greater portion of its length, so as to provide a flange 64 against which the sleeve 63 may rest, thus firmly holding the parts 8 and 9 in contact. Furthermore, the catch 28' may merely consist of a lower shoulder 30' attached to a flexible spring member 29' provided with a curved head 31' adapted to contact with a cone shaped head 65.

As shown in Fig. 7, the sleeve 63 is suspended and lowered into the well hole by means of a cable 66 connected to a yoke 67 which is firmly attached to the sleeve 63. A yoke 68 provided with an aperture 69 through which the cable 66 may pass, passes in interlocking engagement within the yoke 67 and is attached to a bolt 70 passing through an aperture in a cap 71 threadedly connected to the upper end of the sleeve 63. Within the sleeve 63 the end of the bolt is threadedly connected by means of a coupling 72 to a piece of tubing 73, which tubing carries at its lower end the conical head 65. The coupling 72 acts as an upper stop for the tubing 73, being in abutting relation with the cover 71 of the sleeve 63.

Normally, the vertically movable yoke 68, together with its connected parts, including the bolt 70, tubing 73 and head 65, is maintained in position as indicated in Fig. 7, by means of a compression spring 74 preferably resting upon the upper surface of the cap 71, and bearing against a nut 75 carried by the bolt 70. A short sleeve 76 carried by the washer 75 protects the spring 74 by enclosing the same, and prevents the bolt 70 from passing through the cap 71 a greater distance than is desired.

The recording instrument carried within the head 26 is operated when desired, in the following manner: The entire device, as shown in Fig. 7, is lowered into the well hole by means of cable 66, and after it has reached the point at which a reading is to be taken, a heavy weight in the form of a length of pipe placed around the cable 66 is dropped along such cable. The pipe strikes the vertically movable yoke 68, depressing the same. The downward movement of the yoke 68 is transmitted by bolt 70 to the tubing 73, thus causing the conical head 65 to contact with the upper end 31' of the latch member 28', thus releasing the plunger 18' and transfixing the float 1 in position.

If, instead of surveying a well by means of cable tools it is desired to attach the surveying instrument to a section of tubing, the device may be connected to a tubing 42 as shown in Fig. 8. As shown in this figure, the device is placed within an exploring head 62 and the perforated sleeve 33' firmly attached to the head 62, said sleeve 33' holding the housing of the device firmly within the head 62. The sleeve 33' extends above the housings 8 and 9 of the device proper, and surrounds the latching or locking mechanism including the spring arm 29 and latching head 28. The sleeve 33' may be provided with a head portion 80 having a restricted opening 35' therein adapted to receive a ball 49'. The sleeve 33' is threadedly connected to the drill tubing 42.

The device shown in Fig. 8 may be lowered into a well hole while the drilling mud is being circulated. After the device reaches the proper position in the well hole at which a reading is to be taken, the ball 49' may be dropped through the drill pipe 42, said ball being directed by the head 80 of the perforated sleeve 33' into aperture 35' into contact with the latching head 28 of the device. The pressure of the drilling fluid then forces the ball 49' completely into the chamber formed by the perforated sleeve 33', thus causing the ball 49' to move the latching head 28 and release the transfixing mechanism connected to the lower end of rod 21. The mud fluid then circulates out of the sleeve 33' through the apertures 34'.

Obviously, the device shown in Figs. 6 and 7 is adapted for quicker use, inasmuch as it is not necessary to consume a considerable amount of time for jointing and unjointing the drill pipe 42. Operators, however, may object to the introduction of cables into a well, because of the difficulty of fishing for the cable if it should break and fall to the bottom of the well. While the drill tubing takes longer to use, the method is perhaps safer than when the cable method of surveying is employed.

Although certain specific forms of the device have been described in considerable detail, it is to be understood that the invention is not limited thereto, but in general relates to a form of surveying device characterized by a float chamber containing a magnetic compass adapted to float in liquid within the float chamber, and provided with means carried by said compass below the liquid level thereof in said float chamber, for maintaining the compass in spaced relation to the walls of said float chamber, together with means for locking or transfixing the compass in any given position, such locking or transfixing means being operable from the top of the well in which the device is positioned.

All such changes and modifications as come within the scope of the appended claims are, therefore, embraced thereby.

We claim:

1. In a well surveying device, the combination of a housing containing a float chamber, liquid in said chamber, a float containing a magnetic element, said float being adapted to be suspended in the liquid within said float chamber thus forming a magnetic compass, and a circular disc rotatably attached to the bottom of the float for maintaining said float in spaced relation to the walls of said float chamber.

2. In a well surveying device, the combination of housing portions adapted to engage each other to form a housing, opposing hemispherical recesses in said housing portions, said recesses being adapted to form a float chamber when said housing portions are in engagement, liquid in said float chamber, a magnetic compass adapted to float in liquid the within said float chamber, and a circular disc rotatably attached to the bottom of the compass for maintaining said compass in spaced relation to walls of said float chamber.

3. In a well surveying device, the combination of a housing containing a float chamber, liquid in said float chamber, a float containing a magnetic element, said float being adapted to be suspended in the liquid within said float chamber thus forming a magnetic compass, means associated with said float below the liquid level thereof in said float chamber, for preventing contact between the float and the side walls of said float chamber, and means operable from the top of a well in which said device is positioned for locking the float in any given position.

4. In a well surveying device, the combination of a housing containing a float chamber, liquid in said float chamber, a float containing a magnetic element, said float being adapted to be suspended in the liquid within said float chamber thus forming a magnetic compass, a circular disc rotatably attached to the bottom of the float for maintaining said float in spaced relation to walls of said float chamber, and means operable from the top of a well in which said device is positioned for transfixing the float in any given position.

5. In a well surveying device, the combination of housing portions adapted to engage each other to form a housing, each of said housing portions being provided with an opposing hemispherical recess, said recesses being adapted to form a float chamber when said housing portions are in engagement, liquid in said float chamber, a float containing a magnetic element, said float being adapted to be suspended in the liquid within said float chamber, a circular bumper operably associated with the float below the liquid level thereof in the float chamber, for preventing contact between the float and the side walls of said float chamber, and means operable from the top of a well in which said device is positioned for transfixing the float in any given position.

6. In a well surveying device, the combination of housing portions adapted to engage each other to form a housing, each of said housing portions being provided with an opposing hemispherical recess, said recesses being adapted to form a float chamber when said housing portions are in engagement, a liquid in said float chamber, a magnetic compass adapted to float in said liquid, a circular disc rotatably attached to the bottom of the compass for maintaining said compass in spaced relation to walls of said float chamber, and means operable from the top of a well in which said device is positioned for locking the compass in any given position.

7. In a well surveying device, the combination of a housing provided with a float chamber, a liquid in said float chamber, a float containing a magnetized bar, said float being adapted to be suspended in the liquid within said float chamber thus forming a magnetic compass, means carried by said float below the liquid level thereof in said float chamber for maintaining said float in spaced relation to walls of said float chamber, spring energized means for locking the float in any given position, and means for releasing said spring actuated locking means from the top of a well in which said device is positioned.

8. In a well surveying device, the combination of housing portions adapted to engage each other to form a housing, each of said housing portions being provided with an opposing hemispherical recess, said recesses being adapted to form a float chamber when said housing portions are in engagement, a liquid in said float chamber, a magnetic compass adapted to float in the liquid within said float chamber, a circular bumper operably carried by the compass below the liquid level thereof in the float chamber, for maintaining said compass in spaced relation to walls of said float chamber, spring energized means for transfixing the compass in any given position, and means for releasing said spring actuated transfixing means from the top of a well in which said device is positioned.

9. In a well surveying device, the combination of a housing containing a float chamber, liquid in said float chamber, a float containing a magnetic element, said float being adapted to be suspended in the liquid within said float chamber thus forming a magnetic compass, means associated with said float below the liquid level thereof in said float chamber, for preventing contact between the float and the side walls of said float chamber, spring actuated means for transfixing the float in any given position, means for locking said transfixing means in a retracted position, and means operable from the top of a well in which said device is positioned for releasing said locking means.

10. In a well surveying device, the combination of housing portions adapted to engage each other to form a float chamber, a liquid within said float chamber, a magnetic element mounted in a float, said float being supported in the liquid within said float chamber, a circular disc rotatably attached to the bottom of the float for maintaining said float in spaced relation to walls of said float chamber, spring actuated means for transfixing the float in any given position, means for locking said transfixing means in a retracted position, and means operable from top of a well in which said device is positioned for releasing said locking means.

11. In a well surveying device, the combination of: a housing provided with a float chamber; a liquid in said chamber; a buoyant magnetic compass having its center of gravity below its center of buoyancy, said compass being adapted to float in a stable position in the liquid within said chamber regardless of the degree of inclination of the housing; means carried by the compass below the liquid level in said float chamber whereby said compass is prevented from adherent contact with walls of said chamber, spring energized means for locking the compass in any given position, and means for releasing said spring energized locking means from the top of a well in which the device is positioned.

12. In a well surveying device, the combination of: a housing provided with a float chamber; a liquid in said chamber; a buoyant magnetic compass having its center of gravity below its center of buoyancy, said compass being adapted to float in a stable position in the liquid within said chamber regardless of the degree of inclination of the housing; a circular bumper operably associated with said buoyant compass below the liquid level in said float chamber whereby said compass is prevented from adherent contact with walls of said chamber; spring actuated means for transfixing the compass in any given position, means for locking said transfixing means out of contact with said compass, and means for releasing said locking means from the top of a well in which said device is positioned.

13. In a well surveying device, the combination of: a housing provided with a float chamber; a liquid in said chamber; a buoyant magnetic compass having its center of gravity below its center of buoyancy, said compass being adapted to float in a stable position in the liquid within said chamber regardless of the degree of inclination of the housing; means carried by the compass below the liquid level in said float chamber whereby said compass is prevented from adherent contact with walls of said chamber; means carried by the housing for locking the compass in any given position, means for latching said compass locking means in an unlocked position, and means for releasing said latching means from the top of a well in which the device is positioned; said releasing means including a perforated sleeve operably connected to said housing and enclosing said latching means, said sleeve being provided with a restricted opening adapted to guide a ball under mud fluid pressure into operative releasing contact with said latching means.

WILLIAM I. McLAUGHLIN.
HENRY N. HERRICK.
RUPERT G. WEDEMEYER.